(12) United States Patent
Griffioen et al.

(10) Patent No.: US 7,991,256 B2
(45) Date of Patent: Aug. 2, 2011

(54) OPTICAL FIBER CABLE AND METHOD FOR MODIFYING THE SAME

(75) Inventors: Willem Griffioen, Ter Aar (NL); Klaus Nothofer, Erkrath (DE)

(73) Assignee: Draka Comteq, B.V., Amsterdam (NL)

( * ) Notice: Subject to any disclaimer, the term of this patent is extended or adjusted under 35 U.S.C. 154(b) by 65 days.

(21) Appl. No.: 11/780,217

(22) Filed: Jul. 19, 2007

(65) Prior Publication Data
US 2008/0199137 A1 Aug. 21, 2008

(30) Foreign Application Priority Data
Jul. 19, 2006 (EP) .................................. 06076440

(51) Int. Cl.
*G02B 6/44* (2006.01)
(52) U.S. Cl. ......................... 385/109; 385/110; 385/112
(58) Field of Classification Search .................. 385/109, 385/110, 112
See application file for complete search history.

(56) References Cited

U.S. PATENT DOCUMENTS

| | | | | |
|---|---|---|---|---|
| 3,766,307 A * | 10/1973 | Andrews, Jr. | .................. | 174/47 |
| 4,815,813 A | 3/1989 | Arroyo et al. | | |
| 5,235,134 A * | 8/1993 | Jaycox | ............................ | 174/87 |
| 5,335,408 A * | 8/1994 | Cobb | ............................ | 29/447 |
| 5,838,864 A * | 11/1998 | Patel et al. | .................... | 385/113 |
| 6,321,012 B1 | 11/2001 | Shen | | |
| 6,371,691 B1 * | 4/2002 | Finzel et al. | .................... | 405/157 |
| 6,424,772 B1 * | 7/2002 | Blazer et al. | .................. | 385/110 |
| 6,572,081 B2 | 6/2003 | Griffioen et al. | | |
| 6,633,709 B2 | 10/2003 | VanVickle et al. | | |
| 6,654,525 B2 * | 11/2003 | Nechitailo et al. | ............ | 385/103 |
| 6,681,070 B2 * | 1/2004 | Cecchi et al. | .................. | 385/109 |
| 6,749,446 B2 * | 6/2004 | Nechitailo | ..................... | 439/114 |
| 6,778,744 B2 * | 8/2004 | Norris et al. | .................. | 385/113 |
| 7,050,688 B2 * | 5/2006 | Lochkovic et al. | ........... | 385/128 |
| 7,386,208 B2 * | 6/2008 | Bosisio et al. | ................. | 385/102 |
| 2002/0081083 A1 | 6/2002 | Griffioen et al. | | |
| 2002/0136511 A1 * | 9/2002 | Cecchi et al. | .................. | 385/109 |
| 2003/0044139 A1 * | 3/2003 | Norris et al. | .................. | 385/113 |
| 2003/0068145 A1 * | 4/2003 | Nechitailo et al. | ............ | 385/103 |

(Continued)

FOREIGN PATENT DOCUMENTS
DE 2842604 A1 4/1980
(Continued)

OTHER PUBLICATIONS

European Search Report and Written Opinion for corresponding European Patent Application No. 06076440, completed on Jan. 24, 2007.

*Primary Examiner* — K. Cyrus Kianni
(74) *Attorney, Agent, or Firm* — Summa, Additon & Ashe, P.A.

(57) ABSTRACT

Disclosed is an optical fiber cable that includes a main tube. A guide tube, which includes at least one optical element, is positioned within the main tube's central space. A compressible element is also positioned within the main tube's central space. To reduce the adverse effects of ice formation within the optical fiber cable, the compressible element more readily deforms than do the guide tube and main tube. Also disclosed is a method for modifying a conventional optical fiber cable with a compressible element according to the present invention.

28 Claims, 6 Drawing Sheets

U.S. PATENT DOCUMENTS

| | | | |
|---|---|---|---|
| 2003/0068146 A1* | 4/2003 | Nechitailo et al. | 385/103 |
| 2003/0068147 A1* | 4/2003 | Nechitailo | 385/114 |
| 2004/0105634 A1* | 6/2004 | Bosisio et al. | 385/100 |
| 2005/0013573 A1* | 1/2005 | Lochkovic et al. | 385/128 |
| 2005/0105874 A1* | 5/2005 | Finzel et al. | 385/135 |
| 2005/0249472 A1 | 11/2005 | Diggle, III et al. | |
| 2006/0193570 A1* | 8/2006 | Brown | 385/100 |
| 2008/0199137 A1 | 8/2008 | Griffioen et al. | |

FOREIGN PATENT DOCUMENTS

| | | |
|---|---|---|
| EP | 1081519 A1 | 3/2001 |
| EP | 1302797 A1 | 4/2003 |
| EP | 1881353 A1 | 1/2008 |
| JP | 2006050713 | 2/2006 |

* cited by examiner

FIGURE 9
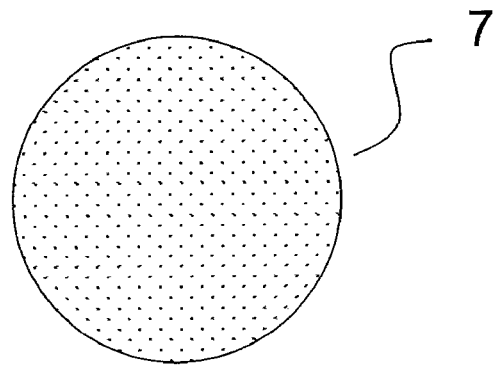
FIGURE 10
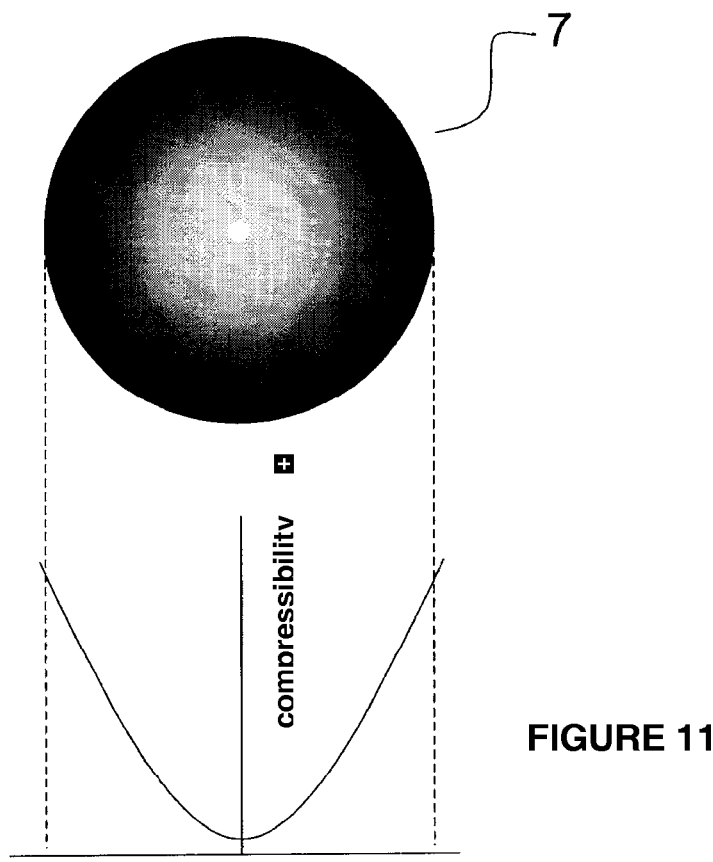
FIGURE 11

OPTICAL FIBER CABLE AND METHOD FOR MODIFYING THE SAME

CROSS-REFERENCE TO PRIORITY APPLICATION

This application hereby claims the benefit of pending European Application No. 06076440.4 (filed Jul. 19, 2006, at the European Patent Office), which is hereby incorporated by reference in its entirety.

FIELD OF THE INVENTION

The present invention relates to optical fiber cables that include a compressible element that reduces the adverse effects of freezing water (i.e., expansion).

BACKGROUND OF THE INVENTION

Various optical fiber cables are known. For example, U.S. Pat. No. 6,572,081 describes an optical fiber cable and a method for installing guide tubes through which optic communication cables are routed. Such cables are generally installed underground such that the main tube is accessible via its ends.

The optical fiber cable according to the present invention may also be defined as a tube system for optical fiber cables, wherein a tube, also known as "main duct," of such a tube system corresponds to the main tube of the present application. Furthermore, the guide tubes according to the present invention are also referred to as "micro ducts."

After installation of the main tube, the number of guide tubes and the optical waveguides that may be present therein may be adapted to the current need. It is also possible to add guide tubes to the hollow space of the main tube and optical waveguides to the guide tubes.

Guide tubes containing optical waveguides may also be installed prior to the installation of the main tube. Usually, however, the main tube is installed first and subsequently the guide tubes are installed via the blow, push, float, or draw method. Optical waveguides can be similarly installed in the guide tubes via the blow, push, float or draw method.

A drawback of the optical fiber cables that are presently commercially available is that the main tube (and possibly the guide tubes), after installation, may be insufficiently water resistant (e.g., leak-tight). Consequently, there is a possibility that water will enter the main tube (or the guide tubes).

One cause of such water ingress (i.e., in-leakage) is that the main tube and/or the guide tubes are damaged before, during, or after installation. Another cause of water ingress is that connections between various main tubes and/or guide tubes in a cable network are not watertight. In addition, there is a risk of water remaining behind in the main tube when the so-called float method is used for installing guide tubes or optical waveguides. This may lead to adverse effects.

One problem with the presence of water in the hollow space of the main tube is that the water may freeze. The expansion of water upon freezing exerts pressure both on the wall of the main tube (i.e., inside-out pressure) and pressure on the guide tubes (i.e., outside-in pressure). Pressure from ice will also be exerted on the optical waveguides present in the guide tubes. Consequently, the signal being conveyed through the optical waveguides will be disturbed, which in turn will cause the communication network (of which the cable forms a part) to malfunction.

Moreover, if the damage from freezing water is permanent, it may be necessary to repair the cable and/or replace the optical waveguides. This, of course, involves considerable expense.

German Publication No. 2842604 discloses a method for dimensioning the wall of a tube in which optical waveguides are present such that the adverse effects of the freezing of water are eliminated.

It is known in the art to employ water-absorbing or water-blocking materials (e.g., tape, yarn, gel, powder, or combinations thereof) to reduce or prevent the ingress of water into optical fiber cables.

For example, U.S. Pat. No. 4,815,813 discloses water-blocking strips or yarns that may be wrapped around or be provided parallel to a central tube.

U.S. Pat. No. 6,321,012 (and counterpart European Patent Application No. 1,081,519 A1) discloses the use of a water-swellable binding yarn or tape wrapped around a bundle of optical fibers or around tubes in which optical fibers are present.

U.S. Pat. No. 6,633,709 discloses a cable wherein water-blocking yarns are provided around stacked fiber optic ribbons with or without the use of a water-absorbing powder.

European Patent Application No. 1,302,797 A1 discloses an optical fiber cable configuration having a tubular outer jacket that houses a plurality of buffer tubes containing optical fiber ribbons. A central strength member is positioned concentrically with respect to the outer jacket and includes a strength tube, which can change in shape upon application of force on the optical fiber cable configuration.

The foregoing patents and publications are hereby incorporated by reference in their entirety.

The use of one or more water absorption materials involves additional expense and, in addition, makes it more difficult to install guide tubes containing optical waveguides in the main tube via the blow, push, float, or draw method. When a water-absorbing gel is introduced into the hollow space, for example, the frictional resistance that is subsequently generated between a guide tube to be installed and the aforementioned gel will be so high that only short installation distances can be bridged. This means that the length of the main tube is limited. The consequence is that it is necessary to couple successive main tubes more frequently, which is undesirable, as it involves an increased risk of leakage.

Therefore, there is a need for an optical fiber cable whose designs limits the adverse effects of freezing water within its main tube.

SUMMARY OF THE INVENTION

It is an object of the present invention to develop an optical fiber cable that is resistant to low-temperature conditions, particularly when moisture is present in the cable.

It is another object to provide an optical fiber cable that will not be adversely affected by water that has entered the hollow space (e.g., freezing).

It is yet another object of the present invention to provide an element that can be installed in the hollow space of a cable that has already been installed so as to render the cable resistant to the effects of low-temperature conditions.

Accordingly, the present invention embraces an optical fiber cable that includes a main tube having a wall that defines a hollow space. One or more guide tubes are present within this hollow space. At least one of the guide tubes contains at least one optical waveguide. Furthermore, a compressible element, which reduces the adverse effects of ice formation within the main tube, is likewise present within the aforementioned hollow space. The present invention further embraces a method for modifying an optical fiber cable to include such a compressible element.

In particular, at least one separate compressible element is present in the hollow space defined by the main tube (e.g., the compressible element being unsecured to the main tube). In a typical embodiment, at least one compressible element, which extends along much of the length of the main tube, has a lower resistance to deformation than that of both the wall of the guide tube and the wall of the main tube. Stated otherwise, the outer portion of the compressible element will deform more easily than the respective walls of the guide tube and the main tube.

If and when water enters the hollow space of the optical fiber cable and subsequently freezes, the volumetric difference between water as a solid (i.e., ice) and water as a liquid is accommodated (i.e., compensated for) by compression of the compressible element. The compressible element will thus decrease in volume. When the temperature increases, the ice that had previously formed will melt, thereby decreasing in volume, and the volume of the compressible element will correspondingly increase. Typically, the compression of the compressible element is reversible in this way.

Although a tube provided with a compressible foam layer of a synthetic material on the inner surface thereof is known from Japanese Patent Application No. JP 2006/050713, the foam layer that is used therein cannot be considered to be present as a distinct element. Because the foam layer described in this published application is placed against the inner side of the tube, the internal volume of the tube, in which guide tubes can be installed, is significantly reduced. In addition, this design requires a large amount of foam per unit length of tube.

Furthermore, the foam layer must adhere to the inner wall of the tube in all temperature conditions. If the foam layer comes loose from the tube wall (e.g., due to insufficient adhesion), the tube will become clogged, and the installation of guide tubes is no longer possible. The necessity to achieve good adhesion limits the choice of material for the tube and/or the foam layer.

In contrast, the compressible element according to the present invention is separately present in the main tube (i.e., freely positioned within the main tube's central space). As used herein, the term "separately" will be understood to mean that the element is not durably connected to the wall of the main tube. Moreover, because the compressible element is separately present it does not necessarily have to be added to the main tube during the manufacturing process. It may also be provided simultaneously with the installation of guide tubes and/or optical waveguides. In addition, the present invention makes it possible to modify a conventional optical fiber cable, such as that according to the aforementioned U.S. Pat. No. 6,572,081, by the addition of a compressible element.

In the optical fiber cable according to the present invention, the compressible element typically does not contain optical fibers.

In the optical fiber cable according to the present invention, the compressible element is typically freely movable within the hollow space of the main tube.

In one embodiment of the optical fiber cable according to the present invention, the compressible element is wound around (i.e., provided around) one or more guide tubes.

In another embodiment of the optical fiber cable according to the present invention, the compressible element includes at least a sheath and a core. In this regard, the sheath may be made of the same material as the wall of the guide tube.

In yet another embodiment of the optical fiber cable according to the present invention, the compressible element is made of one composition, such as a homogeneous blend, rather than a multi-component structure. For instance, this embodiment embraces a structure in which the compressible element employs the same foam composition, either at the same or different densities.

In a particular embodiment in which the compressible element is made of one composition, the compressibility of the compressible element varies over its cross-section. Typically, the compressibility of the compressible element is greater at the outer side than at its center.

In yet another embodiment of the optical fiber cable according to the present invention, the compressible element is provided with one or more reinforcing elements, such as a centrally located reinforcing element. In a particular embodiment, one or more reinforcing elements are present in the sheath of the compressible element and extend along the length of the cable.

In a particular embodiment of the optical fiber cable according to the present invention, the compressible element has a circular cross-section.

The compressible element according to the present invention is typically elastic so that it can return to its original shape after compression (i.e., upon release of the force that caused the compression).

In general, the compressible element's resistance to deformation is lower than the resistances to deformation of the respective walls of the guide tube and main tube.

The compressible element can be readily installed in the hollow space of a main tube of an optical fiber cable.

Other advantages and features of the invention will become apparent upon reading the following description of non-limiting invention embodiments, which are provided by way of example and with reference to the appended drawings.

BRIEF DESCRIPTION OF THE DRAWINGS

FIGS. 9-13 depict cross-sectional views of various embodiments of the compressible element according to the present invention.

DETAILED DESCRIPTION

In one aspect, the present invention embraces an optical fiber cable that includes a compressible element.

Figure 1:
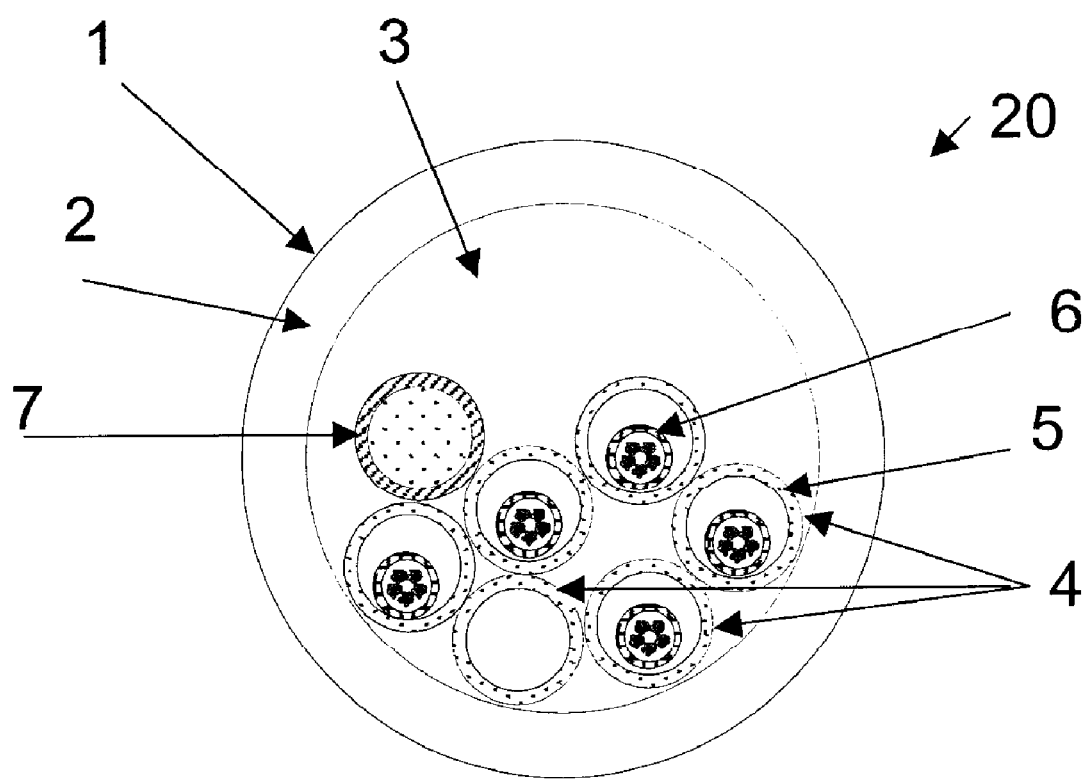
FIG. 1 depicts an optical fiber cable according to the present invention.
Figure 2:
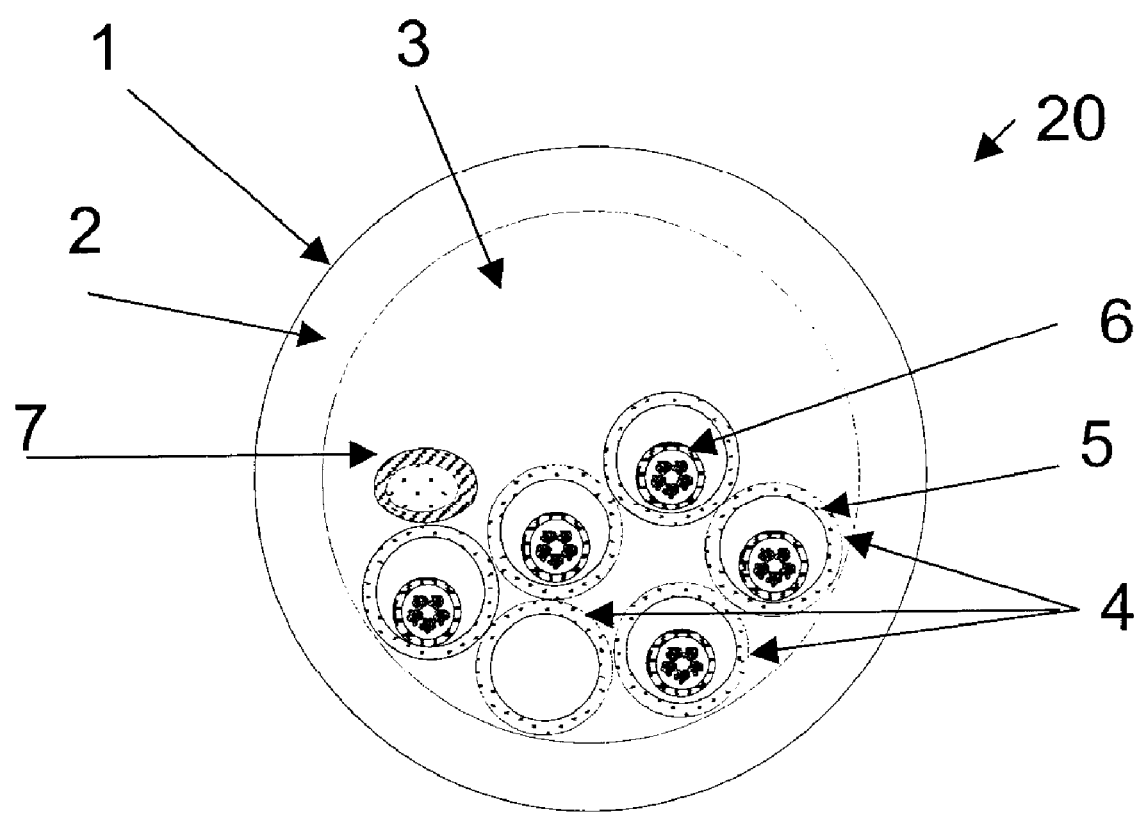
FIG. 2 depicts an optical fiber cable according to the present invention in which the compressible element is compressed.
Figure 3:
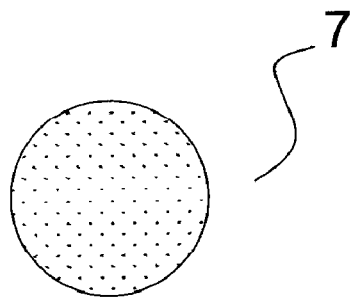
FIGS. 3-8 depict exemplary cross-sectional shapes of the compressible element according to the invention.
Figure 4:
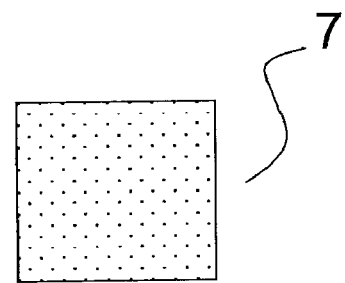
Figure 5:
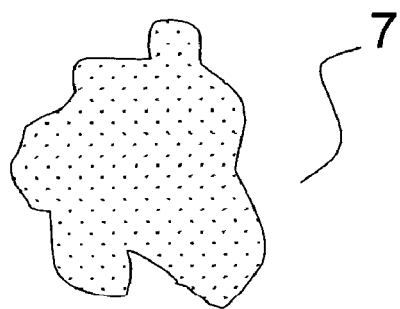
Figure 6:
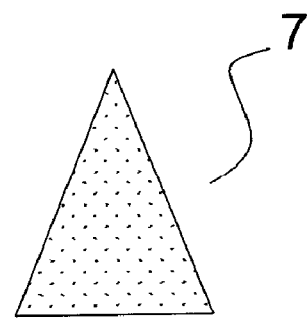
Figure 7:
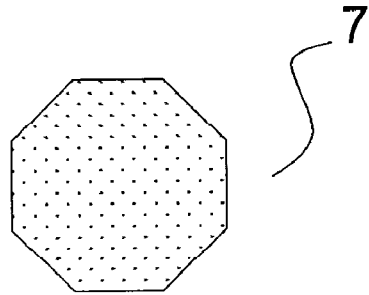
Figure 8:
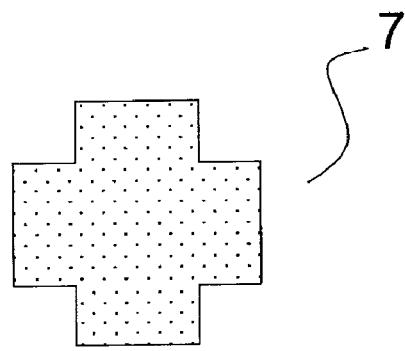

A first embodiment of the present invention is depicted in FIGS. 1 and 2. FIG. 1 shows an optical fiber cable 20 that includes a main tube 1 that encloses a hollow space 3 (i.e., forms a central space). The main tube 1 is formed by a main tube wall 2. Present within the hollow space 3 are one or more guide tubes 4, each having a guide tube wall 5. The guide tubes 4 may contain one or more optical waveguides 6. Also present within the hollow space 3 is a compressible element 7 according to the present invention.

The free volume within the main tube 1 is made up of the volume of the hollow space 3 less the volume that is taken up by the guide tubes 4 and the compressible element 7.

FIG. 1 also shows that a guide tube 4 does not necessarily have to contain an optical waveguide 6. It should be noted that the number of guide tubes 4 and compressible elements 7 shown in FIG. 1 is not limited to a specific number.

Damage to the main tube 1, a poorly made connection between two or more main tubes 1, or even the use of the float method for installing the main tube 1 and/or the guide tubes 4 may result in the ingress of water (not shown) into the free volume of the optical fiber cable 20. At low temperatures, the water present in the free volume may freeze. As solid water (i.e., ice) has a specific volume that is about ten percent greater than that of liquid water, the compressible element 7 will be compressed. This is schematically indicated in FIG. 2.

Generally, according to the present invention, the volume increase caused by the ice is thus compensated by a volume decrease of the compressible element 7. As a result, the guide tubes 4 and the main tube 1 will not be subjected to pressure. Likewise, the optical waveguides 6 will not be subjected to pressure, and the communication network (not shown) of which the optical fiber cable 20 forms part will continue to function. Moreover, the main tube 1 will not sustain further damage, if any.

By way of non-limiting example, the main tube 1 may be made of high-density polyethylene (HDPE), polyamide (PA), polyvinyl chloride (PVC), polypropylene (PP), or a metal, or possibly a combination thereof. If the resistance to deformation of the compressible element 7 is lower than the resistance to deformation of the main tube 1, the volume increase of water caused by freezing thereof will lead to compression of the compressible element 7, and the resulting ice will not exert pressure on the main tube 1.

As used herein, the concept of deformation of the compressible element 7 will be understood to mean compression.

The main tube 1 is typically a very rigid tube that is inherently insensitive to deformation by the application of external force. Even in the case of deformation upon the application of external force (i.e., an outside-in deformation, which is in the opposite direction to a deformation occurring in the case of water inside the main tube 1 freezing), there is enough hollow space 3 inside the main tube 1 to accommodate this deformation.

By way of non-limiting example, the guide tubes 4 are made of high-density polyethylene (HDPE), low-density polyethylene (LDPE), or medium-density polyethylene (MDPE). If the resistance to deformation of the compressible element 7 is lower than the resistance to deformation of the guide tubes 4, the volume increase of water caused by freezing will lead to compression of the compressible element 7, and the resulting ice will not exert pressure on the guide tubes 4.

The optical waveguides 6 may be individual optical fibers, which may or may not be provided with one or more layers of a protective coating. The optical waveguides may also be present in the form of so-called ribbons. In a ribbon, one or more optical fibers may be densely embedded in a matrix material. Furthermore, the optical fibers or the ribbons may also be used as a bundle (e.g., as a cable), which may or may not be provided with reinforcing elements.

As used herein, the term "optical fiber" is broadly used to embrace both plastic-based and silica-based optical fibers.

As used herein, the term "compressible element" is used to mean a structure that will decrease in volume under the influence of a pressure being exerted thereon, and which will possibly increase in volume once the cause of the pressure that led to the volume decrease is removed (i.e., the element may be more or less regarded as elastic).

When liquid water that is present in the hollow space 3 of the main tube freezes, the water will expand about ten percent. Pressure will be exerted on the compressible element 7 as a result of this expansion, causing the compressible element 7 to decrease in volume. Once the volume of the compressible element 7 has decreased, the pressure caused by the expansion of the water is removed. In effect, the volume increase of the water caused by the freezing thereof has thus been compensated by the compressible element 7. The volume of the water that is present in solid form (i.e., ice) in the hollow space 3 of the main tube 1 will decrease when the water passes into the liquid phase. Subsequently, the volume of the compressible element 7 will increase again as a result of the water's volume decrease.

As noted, the compressible element 7 typically possesses a resistance to deformation ($W_{ese}$) that is lower than the resistance to deformation of the guide tubes 4 ($W_{gb}$) and the resistance to deformation of the main tube 1 ($W_{hb}$):

$$W_{ese} < W_{gb} \text{ and}$$

$$W_{ese} < W_{hb}.$$

Because the resistance to deformation of at least one compressible element 7 is usually lower than the resistance to deformation of the guide tubes 4 and the main tube 1, the compressible element 7 is capable of removing pressure that would otherwise affect the guide tubes 4 and/or the main tube 1. The compressible element 7 thus compensates for the increase in specific volume that occurs as the water freezes.

The desired volume compensation can be achieved by using one or more compressible elements 7 within the main tube 1. When more than one compressible element 7 is used, the sum of the individual volume compensations of the compressible elements 7 equals the total volume to be compensated. The volume decrease per compressible element 7 does not necessarily have to be the same for each individual compressible element 7.

Typically, the compressible element 7 is separately present (e.g., freely positioned) along the entire length of the cable 20. In this regard, the term "separately" means that the compressible element 7 need not be durably (e.g., permanently) connected to the main tube wall 2. In particular, the compressible element 7 is freely movable within the hollow space 3. In an alternative embodiment, the compressible element 7 is provided around one or more guide tubes 4.

As noted, the compressible element 7 typically does not contain optical fibers.

Those having ordinary skill in the art will appreciate that additional structures may be present within the main tube 1 of the optical fiber cable 20. For example, in one embodiment, the hollow space 3 may also be provided with a water-blocking material (e.g., tape, yarn, or gel) (not shown).

Moreover, and by way of non-limiting example, the optical fiber cable 20 might include at least one optical-fiber-containing structure that has a lower resistance to deformation than at least one optical-fiber-free structure. A relatively deformable optical-fiber-containing structure, for example, might monitor disruptions (e.g., ice formation) within the optical fiber cable 20; a relatively rigid optical-fiber-free structure, for example, might protect other structures within the main tube (e.g., guide tubes 4) against external forces applied to the optical fiber cable.

Various cross-sectional shapes of the compressible element 7 are within the scope of the invention. Exemplary cross-sectional shapes are illustrated in FIGS. 3-8.

In a typical embodiment, the compressible element 7 has a circular cross-section. This makes it possible to install the compressible element 7 in a manner comparable to the installation of the guide tubes 4. To the extent the external diameter of the compressible element 7 is substantially the same as the external diameter of the guide tubes 4, it is possible to use the same equipment for installing the compressible element 7 and the guide tubes 4.

The compressible element 7 may be made of one kind of material as is schematically indicated in FIG. 9. Suitable material includes, for example, polyolefin foam, polyurethane foam, or rubber. The choice of material is determined by the requirements that are made of the compressible element 7 in relation to the choice of material and the wall thicknesses of the main tube 1 and the guide tubes 4.

In an alternative embodiment, which is schematically shown in FIG. 10, compressibility varies over the cross-section of the compressible element 7. FIG. 11 schematically illustrates the compressibility of the compressible element depicted in FIG. 10. In this regard, the compressibility of the compressible element 7 is greater at its outer circumference than at its center. For instance, the compressible element 7 can include foam of the same chemical composition, albeit with greater densities toward its center.

Figure 12:
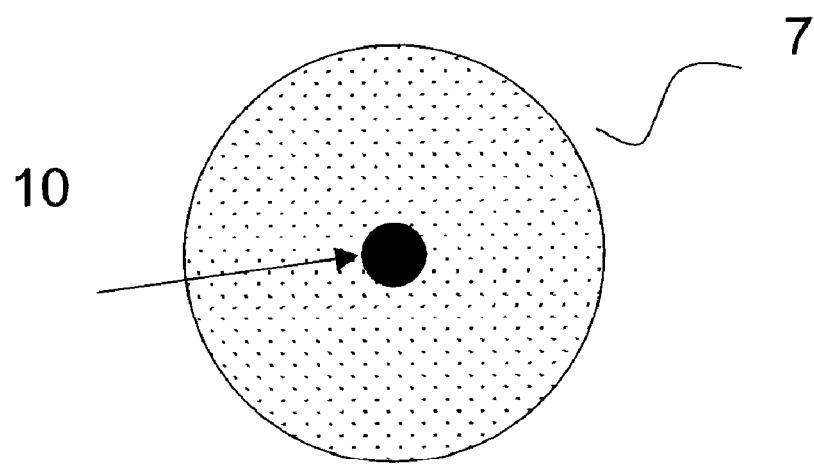

In another alternative embodiment, which is schematically shown in FIG. 12, the compressible element 7 includes a central reinforcing element 10.

Figure 13:
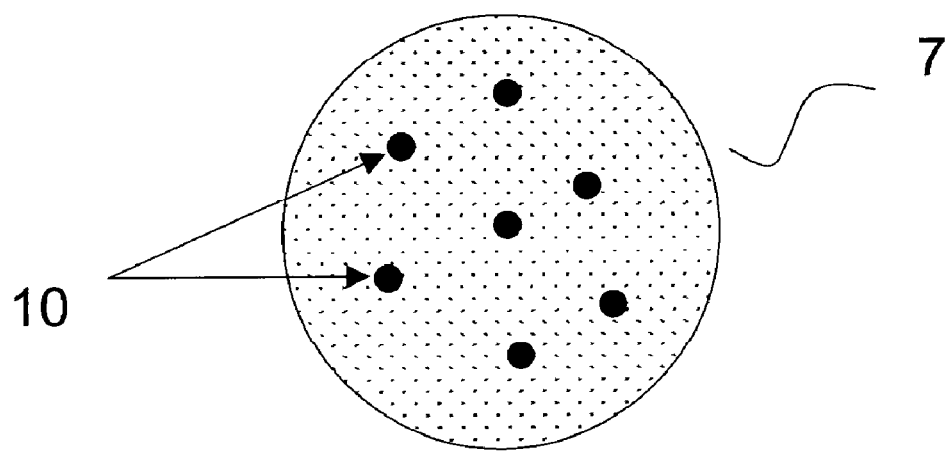

In another alternative embodiment, which is schematically shown in FIG. 13, the compressible element 7 includes several reinforcing elements 10.

In general, the reinforcing elements 10, which, for example, may be made of steel or fiber-reinforced plastic, facilitate the installation of the compressible element 7.

Figure 14:
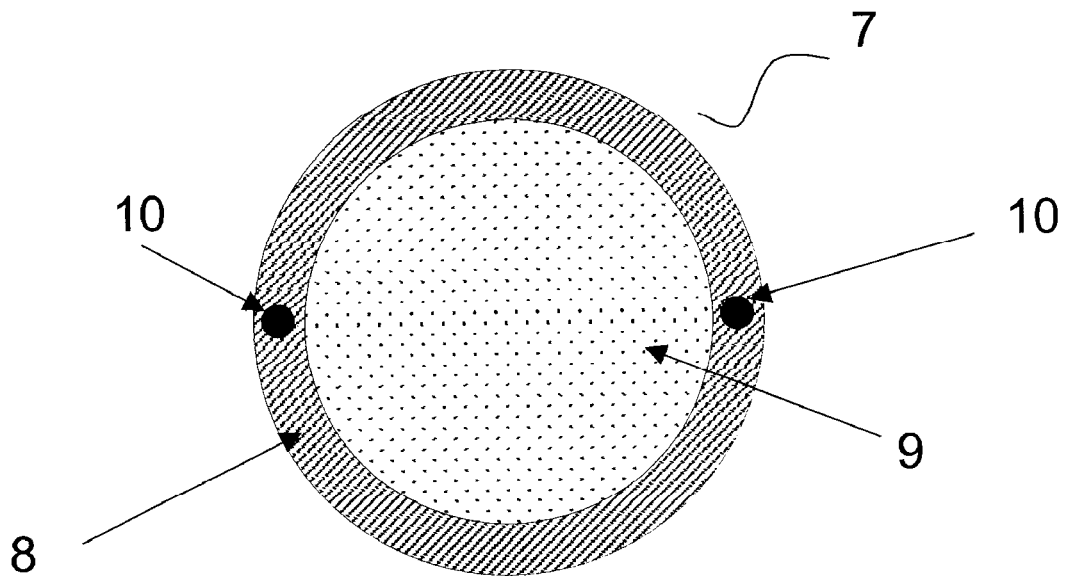
FIG. 14 depicts a cross-sectional view of an exemplary embodiment of the compressible element according to the present invention.

As depicted in FIG. 14, the compressible element 7 may possess a sheath 8 and a core 9 (i.e., a sheath-core structure). The sheath 8, moreover, may optionally contain one or more reinforcing elements 10. The sheath 8 may be made of the same material as the guide tube 4 (i.e., the guide tube wall 5).

As used herein, the term "core" embraces the space that is enclosed by the sheath 8. For instance, a compressible element 7 that is formed of a homogeneous blend includes a homogeneous core 9. The core 9 may also be configured as a hollow space, or it may be fully or partially provided with gel or grease, which, for example, may have water-absorbing or water-repellent properties, respectively.

Figure 15:
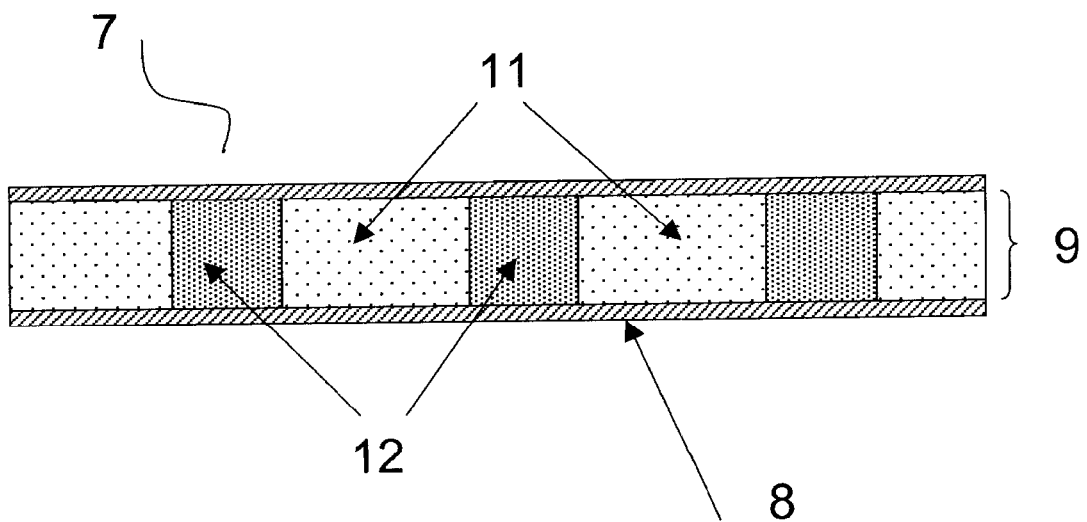
FIG. 15 depicts a longitudinal sectional view of an exemplary embodiment of the compressible element according to the present invention.

FIG. 15 is a longitudinal sectional view of the embodiment of a compressible element 7 having an alternative sheath-core structure. In this regard, the core 9 of the compressible element 7 includes alternating first segments 11 and second segments 12. The first segments 11, may be made for example, of plastic, plastic foam, rubber, gel, or grease. The second segments 12 are only partially filled, if at all, with one of the aforementioned materials. The first and second segments 11 and 12 may not have the same resistance to deformation (i.e., compressibility).

The foregoing embodiments of the compressible element 7 make it possible to modify an already installed conventional optical fiber cable into an optical fiber cable according to the present invention. To that end, one or more compressible elements 7 may be provided in the hollow space of the conventional optical fiber cable. An optical fiber cable thus modified is similar to the optical fiber cable 20 depicted in FIG. 1.

The compressible element 7 may be installed simultaneously with the guide tubes 4, in which case the equipment that is used for installing the guide tubes 4 is also used for installing the compressible element 7. When such an installation method is used, the compressible element 7 will typically have a circular cross-section, and the properties of the material at the outer side of the compressible element 7 will be comparable to those of the material of the guide tube walls 5. The requirements with respect to material properties can be met, for example, if the compressible element 7 is formed with a sheath 8 and a core 9, with the sheath 8 and the guide tube wall 5 being made of the same material.

In the specification and the figures, typical embodiments of the invention have been disclosed. Specific terms have been used only in a generic and descriptive sense, and not for purposes of limitation. The scope of the invention is set forth in the following claims.

The invention claimed is:

1. An optical fiber cable (20), comprising:
  a main tube (1) having a main tube wall (2), said main tube wall defining a central space (3);
  one or more guide tubes (4) positioned within the central space (3) of said main tube (1), each said guide tube (4) having a guide tube wall (5);
  at least one optical waveguide (6) positioned within at least one of said guide tubes (4); and
  one or more separate compressible elements (7) positioned within the central space (3) of said main tube (1) and longitudinally extending along a portion of said main tube (1), each of said compressible elements (7) being freely movable within the central space (3);
  wherein at least one of said compressible elements (7) possesses a resistance to compressive deformation that is lower than (i) the resistance to compressive deformation possessed by at least one guide tube (4) and (ii) the resistance to expansive deformation possessed by said main tube (1).

2. An optical fiber cable (20) according to claim 1, wherein no optical fibers are present within any of said one or more compressible elements (7).

3. An optical fiber cable (20) according to claim 1, wherein at least one of said compressible elements (7) comprises a sheath (8) and a core (9).

4. An optical fiber cable (20) according to claim 3, wherein said sheath (8) is made of the same material as the guide tube wall (5) of at least one of said guide tubes (4).

5. An optical fiber cable (20) according to claim 3, wherein said sheath (8) comprises one or more reinforcing elements (10) that extend along its length.

6. An optical fiber cable (20) according to claim 1, wherein at least one of said compressible elements (7) consists essentially of one kind of material.

7. An optical fiber cable (20) according to claim 1, wherein the compressibility of at least one of said compressible elements (7) varies over a transverse cross-section.

8. An optical fiber cable (20) according to claim 1, wherein the compressibility of at least one of said compressible elements (7) is higher at its outer side than at its center.

9. An optical fiber cable (20) according to claim 1, wherein at least one of said compressible elements (7) possesses a lower resistance to compressive deformation than the resistance to compressive deformation possessed by each guide tube (4).

10. An optical fiber cable (20) according to claim 1, wherein at least one of said compressible elements (7) comprises one or more reinforcing elements (10).

11. An optical fiber cable (20) according to claim 10, wherein at least one of said reinforcing elements (10) is centrally provided in its compressible element (7).

12. An optical fiber cable (20) according to claim 1, wherein at least one of said compressible elements (7) has a circular cross-section.

13. An optical fiber cable (20) according to claim 1, wherein at least one of said compressible elements (7) is an elastically compressible element (7).

14. An optical fiber cable (20) according to claim 1, wherein said guide tubes (4) are not stranded about a strength member.

15. An optical fiber cable (20), comprising:
   a main tube (1) having a main tube wall (2), said main tube wall (2) defining a central space (3);
   a guide tube (4) positioned within the central space (3) of said main tube (1), said guide tube (4) having a guide tube wall (5);
   an optical waveguide (6) positioned within said guide tube (4); and
   a plurality of compressible elements (7) substantially freely and longitudinally positioned within the central space (3) of said main tube (1), each of compressible elements (7) being freely movable within the central space (3);
   wherein no optical fibers are present within said compressible element (7); and
   wherein said compressible element (7) possesses a resistance to compressive deformation that is less than both the resistance to compressive deformation possessed by said guide tube (4) and the resistance to expansive deformation possessed by said main tube (1).

16. An optical fiber cable (20) according to claim 15, wherein said compressible element (7) comprises a sheath (8) and a core (9).

17. An optical fiber cable (20) according to claim 16, wherein said sheath (8) comprises a reinforcing element (10) that extends along at least a portion of its length.

18. An optical fiber cable (20) according to claim 15, wherein the compressibility of said compressible element (7) is substantially uniform over a transverse cross-section.

19. An optical fiber cable (20) according to claim 15, wherein the compressibility of said compressible element (7) varies over a transverse cross-section.

20. An optical fiber cable (20) according to claim 15, wherein the compressibility of said compressible element (7) is higher at its outside surface than toward its center.

21. An optical fiber cable (20) according to claim 15, wherein said compressible element (7) comprises a reinforcing element (10).

22. An optical fiber cable (20) according to claim 21, wherein said reinforcing element (10) is approximately centrally provided in said compressible element (7).

23. An optical fiber cable (20) according to claim 1, wherein the central space (3) is substantially free of water-blocking and water-absorbing materials.

24. An optical fiber cable (20) according to claim 1, wherein at least one of said compressible elements (7) comprises a plastic foam.

25. An optical fiber cable (20) according to claim 1, wherein at least one of said compressible elements (7) comprises polyolefin foam, polyurethane foam, and/or rubber.

26. An optical fiber cable, comprising:
   a main tube having a main tube wall, said main tube wall defining a central space;
   one or more guide tubes positioned within the central space of said main tube, each said guide tube having a guide tube wall;
   at least one optical waveguide positioned within at least one of said guide tubes; and
   one or more separate compressible elements positioned within the central space of said main tube and longitudinally extending along a portion of said main tube, at least one of said compressible elements consisting essentially of one kind of material, and each of said compressible elements being freely movable within the central space;
   wherein at least one of said compressible elements possesses a resistance to compressive deformation that is lower than (i) the resistance to compressive deformation possessed by at least one guide tube and (ii) the resistance to expansive deformation possessed by said main tube.

27. An optical fiber cable according to claim 25, wherein at least one of said compressible elements is provided around at least one of said guide tubes.

28. An optical fiber cable according to claim 26, wherein the compressibility of at least one of said compressible elements is substantially uniform over a transverse cross-section.

* * * * *

UNITED STATES PATENT AND TRADEMARK OFFICE
CERTIFICATE OF CORRECTION

| | |
|---|---|
| PATENT NO. | : 7,991,256 B2 |
| APPLICATION NO. | : 11/780217 |
| DATED | : August 2, 2011 |
| INVENTOR(S) | : William Griffioen and Klaus Nothofer |

It is certified that error appears in the above-identified patent and that said Letters Patent is hereby corrected as shown below:

In the Claims

Claim 15, Column 9, Line 20, reads "space (3) of said main tube (1), each of compressible"
and should read "space (3) of said main tube (1), each of said compressible"

Claim 27, Column 10, Line 37, reads "An optical fiber cable according to claim 25, wherein at"
and should read "An optical fiber cable according to claim 26, wherein at"

Page 1 of 1

Signed and Sealed this
Twelfth Day of June, 2012

David J. Kappos
*Director of the United States Patent and Trademark Office*